United States Patent [19]

Okamura et al.

[11] Patent Number: 4,612,280

[45] Date of Patent: Sep. 16, 1986

[54] HARDENED GELATIN AND METHOD FOR HARDENING GELATIN

[75] Inventors: Hisashi Okamura; Hiroshi Kawamoto, both of Kanagawa, Japan

[73] Assignee: Fuji Photo Film Co., Ltd., Kanagawa, Japan

[21] Appl. No.: 789,810

[22] Filed: Oct. 21, 1985

[30] Foreign Application Priority Data

Oct. 24, 1984 [JP] Japan .................. 59-223457

[51] Int. Cl.$^4$ .......................... C09H 7/00; G03C 1/30
[52] U.S. Cl. .................... 430/621; 430/622; 430/623; 430/625; 530/354; 106/125
[58] Field of Search .......... 260/117; 430/621, 622, 430/623, 625; 106/125

[56] References Cited

U.S. PATENT DOCUMENTS

| | | | |
|---|---|---|---|
| 3,321,313 | 5/1967 | Burness et al. ................. | 430/623 |
| 3,792,021 | 2/1974 | Tschopp et al. ................ | 260/117 X |
| 4,013,468 | 3/1977 | Bergthaller et al. ........... | 260/117 X |
| 4,052,373 | 10/1977 | Sera et al. ..................... | 260/117 |
| 4,055,427 | 10/1977 | Bergthaller et al. ........... | 260/117 X |
| 4,061,499 | 12/1977 | Himmelmann ................. | 260/117 X |
| 4,063,952 | 12/1977 | Himmelmann et al. ....... | 260/117 X |
| 4,119,464 | 10/1978 | Sauerteig et al. .............. | 430/621 X |
| 4,427,768 | 1/1984 | Kitatani et al. ................ | 430/623 |
| 4,510,237 | 4/1985 | Booker ........................... | 430/621 |
| 4,543,324 | 9/1985 | Himmelmann ................. | 430/622 |

Primary Examiner—Howard E. Schain
Attorney, Agent, or Firm—Sughrue, Mion, Zinn, Macpeak and Seas

[57] ABSTRACT

A hardened gelatin and a method for obtaining the hardened gelatin are described, using at least one compound represented by formula (I)

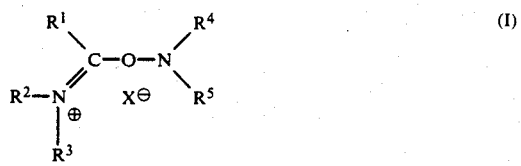

wherein all symbols are as defined in the appended claims. The compounds of formula (I) are high in hardening speed and cause little or no post-hardening. Thus these compounds are very useful, for example, in preparation of a light-sensitive material.

23 Claims, No Drawings

HARDENED GELATIN AND METHOD FOR HARDENING GELATIN

FIELD OF THE INVENTION

The present invention relates to a hardened gelatin hardened with an improved hardening agent. More particularly, it is concerned with hardened gelatin for use in a silver halide photographic light-sensitive material.

BACKGROUND OF THE INVENTION

Gelatin is used as a binder in many photographic light-sensitive materials. For example, each of a silver halide light-sensitive emulsion layer, an emulsion protective layer, a filter layer, an intermediate layer, an antihalation layer, a backing layer, a film base subbing layer, and a baryta layer contain gelatin as a major component.

Light-sensitive materials containing gelatin are processed with various aqueous solutions having various pH and temperature values. In such processing, gelatin is a major component determining the physical properties of a layer containing gelatin which is not treated with a hardening agent. Accordingly the layer is poor in water resistance and excessively swells in an aqueous solution, resulting in a serious reduction in its mechanical strength. Particularly when the material is processed in an aqueous solution maintained at temperatures as high as more than 30° C. or in an aqueous solution having a high alkali content, in extreme cases, the gelatin layer is dissolved and flows out of the material. These properties are critical disadvantages for the photographic light-sensitive material.

A number of compounds have been known to be effective in increasing the light resistance, heat resistance, and mechanical strength of a gelatin layer by hardening gelatin therewith.

These compounds are used as hardening agents in the preparation of photographic light-sensitive materials. Typical examples are aldehyde-based compounds such as formaldehyde and glutaraldehyde; compounds containing a reactive halogen atom as described, for example, in U.S. Pat. No. 3,288,775; compounds containing a reactive ethylenically unsaturated bond as described, for example, in U.S. Pat. No. 3,642,486 and Japanese Patent Publication No. 13563/74; aziridine-based compounds as described, for example, in U.S. Pat. No. 3,017,280; epoxy compounds as described, for example, in U.S. Pat. No. 3,091,537; halogen carboxylaldehydes such as mucochloric acid; dioxanes such as dihydroxydioxane and dichlorodioxane; and inorganic hardening agents such as chromium alum and zirconium sulfate.

These known gelatin-hardening agents, however, when used in a photographic light-sensitive material, give rise to various problems. Some of the hardening agents are poor in the hardening effect. Some hardening agents suffer from a variation in the degree of hardening over a long period of time, which is called "post-hardening", due to their slow hardening of gelatin. Some hardening agents exert adverse influences on properties of the photographic light-sensitive material (particularly, an increase in fog and a reduction in light sensitivity), or lose their hardening capability under the influences of other coexisting photographic additives, or reduce the effect of other photographic additives (e.g., a coloring agent for color light-sensitive materials).

Hardening agents having a relatively high speed for hardening gelatin and less tendency for causing post-hardening include compounds having a dihydroquinoline skelton as described in Japanese Patent Application (OPI) No. 38540/75 (corresponding to U.S. Pat. No. 4,013,468) (the term "OPI" as used herein means a "published unexamined Japanese patent application"), compounds having a phosphorus-halogen bond as described in Japanese Patent Application (OPI) No. 113929/83, compounds having an N-sulfonyloxyimide group as described in Japanese Patent Application (OPI) No. 93470/77 (corresponding to U.S. Pat. No. 4,111,926), compounds containing at least two N-acyloxyimino groups in the molecule thereof as described in Japanese Patent Publication No. 22089/78 (corresponding to U.S. Pat. No. 4,052,373), N-carbamoylpyridinium salts as described in Japanese Patent Application (OPI) Nos. 51945/74 (corresponding to U.S. Pat. No. 3,880,665) and 59625/76 (corresponding to U.S. Pat. No. 4,063,952), 2-sulfonyloxypyridinium salts as described in Japanese Patent Application (OPI) No. 110762/81, and halothiazolium salts as described in Japanese Patent Application (OPI) No. 26844/72.

These hardening agents have advantages in that their gelatin-hardening speeds are high and they less cause post hardening. However, some of them are readily decomposed by the action of water; that is, their gelatin-hardening speeds are high while at the same time the side reaction that they are decomposed by water occurs at a high speed. Accordingly they have disadvantages in that in the usual method of preparation using an aqueous gelatin solution, the efficiency of effectively using the hardening agent is extremely low, and in order to obtain a gelatin coating having a desired degree of hardening, it is necessary to use a large amount of the hardening agent. On the other hand, some of them release acid in a large amount to decrease the pH of a photographic emulsion layer; consequently, they adversely affect to photographic properties.

It is generally believed that hardening agents as described in Japanese Patent Application (OPI) Nos. 51945/84, 59625/76 (corresponding to British Patent No. 1,383,630 and U.S. Pat. No. 4,063,952, respectively), and 110762/81 react with a carboxyl group and an amino group of gelatin under the nucleophilic attack of the groups, thereby hardening gelatin. In preparing a gelatin coating, an aqueous gelatin solution is usually used. In this case, however, it is inevitable that the coexisting water reacts with the hardening agent, thereby decomposing it and making it ineffective, because the water is nucleophilic to a certain extent. This tendency is particularly for hardening agents having a high gelatin-hardening speed. Accordingly, in order to harden gelatin efficiently and rapidly, it is necessary ta develop a hardening agent which reacts with graoups such as a carboxyl group and an amino group more quickly than with water; that is, a hardening agent having good selectivity in reaction with gelatin. Hardening agents such as N-carbamoylpyridinium salts and 2-sulfonyloxypyridinium salts have a disadvantage in that the efficiency of effectively using the hardening agent is poor, probably according to the fact that they are poor in the selectivity as defined above.

It has therefore been desired to develop a hardening agent which has a high efficiency, is high in the gelatin-hardening speed, and is highly soluble in water.

SUMMARY OF THE INVENTION

An object of the present invention is to provide a hardened gelatin using a novel gelatin-hardening agent.

Another object of the present invention is to provide a gelatin-hardening agent which is high in a gelatin-hardening speed and causes little or no post-hardening.

Still another object of the present invention is to provide a gelatin-hardening agent which reacts with reactive radicals of gelatin with high efficiency and thereby efficiently hardens gelatin.

A further object of the present invention is to provide a novel gelatin-hardening agent which seldom reduces pH after the hardening reaction.

It has now been found that the above objects can be attained by using as a hardening agent a compound represented by formula (I) as described hereinafter.

Accordingly, the present invention relates to a hardened gelatin that has been hardened with at least one compound represented by formula (I)

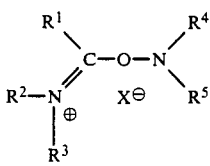

wherein $R^1$ represents a hydrogen atom, a substituted or unsubstituted alkyl group, a substituted or unsubstituted aralkyl group, a substituted or unsubstituted aryl group, a substituted or unsubstituted alkenyl group, a group $R^{11}O—$, a group

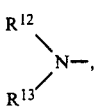

a group

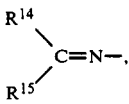

or a group $R^{16}S—$, wherein $R^{11}$, $R^{12}$, $R^{13}$, $R^{14}$, $R^{15}$ and $R^{16}$ (which may be the same or different), each represents a substituted or unsubstituted alkyl group, a substituted or unsubstituted aralkyl group, a substituted or unsubstituted aryl group or a substituted or unsubstituted alkenyl group; or $R^{14}$ and $R^{15}$ each represents a hydrogen atom, or $R^{12}$ and $R^{13}$, or $R^{14}$ and $R^{15}$ combine together to form a ring structure; or $R^1$ together with $R^2$ forms a nitrogen-containing heterocyclic ring, or may be further condensed with another ring.

$R^2$ and $R^3$ (which may be the same or different) each represents a substituted or unsubstituted alkyl group, a substituted or unsubstituted aralkyl group, a substituted or unsubstituted aryl group or a substituted or unsubstituted alkenyl group, or combine together to form a nitrogen-containing heterocyclic ring;

$R^4$ and $R^5$ (which may be the same or different) each represents a substituted or unsubstituted alkyl group, a substituted or unsubstituted aralkyl group, a substituted or unsubstituted aryl group, a substituted or unsubstituted alkenyl group, a group

a group $R^{42}—SO_2—$, or a group $R^{43}—N\!=\!N—$ or $R^4$ and $R^5$ share the same carbon atom with each other so that the group

takes a form

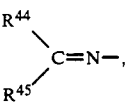

or $R^4$ and $R^5$ combine together to form a nitrogen-containing heterocyclic ring, and further may be condensed with another ring, $R^{41}$, $R^{42}$, $R^{43}$, $R^{44}$, and $R^{45}$ (which may be the same or different) each represents a substituted or unsubstituted alkyl group, a substituted or unsubstituted aralkyl group, a substituted or unsubstituted aryl group, or a substituted or unsubstituted alkenyl group; or $R^{44}$ and $R^{45}$ each represents a hydrogen atom or combine together to form a ring; and $X^\ominus$ represents an anion or combines together with another portion of the compound of formula (I) to form an intramolecular salt.

DETAILED DESCRIPTION OF THE INVENTION

The various groups of formula (I) are described below in more detail.

$R^1$ is a hydrogen atom, or preferably a straight or branched alkyl group having from 1 to 20 carbon atoms (e.g., a methyl group, an ethyl group, a butyl group, a 2-ethylhexyl group, and a dodecyl group), an aralkyl group having from 7 to 20 carbon atoms (e.g., a benzyl group and a phenetyl group), an aryl group having from 6 to 20 carbon atoms (e.g., a phenyl group and a naphthyl group), an alkenyl group having from 2 to 20 carbon atoms (e.g., a vinyl group and a propenyl group), a group $R^{11}—O—$, a group

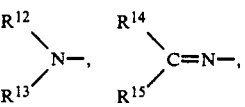

or a group $R^{16}—S—$.

$R^1$ may be substituted. Typical examples of such substituents are a halogen atom (e.g., F, Cl, Br or I), an alkoxy group having from 1 to 20 carbon atoms, an aryloxy group having from 6 to 20 carbon atoms, an N,N-di-substituted carbamoyl group, and an N,N-di-substituted sulfamoyl group. Examples for the substituent on the nitrogen atom include an alkyl group having from 1 to 20 carbon atoms, an aryl group having from 6 to 20 carbon atoms and an aralkyl group having from 7 to 20 carbon atoms.

In the above formulae, $R^{11}$, $R^{12}$, $R^{13}$, $R^{14}$, $R^{15}$ and $R^{16}$ each preferably represents a straight or branched alkyl group having from 1 to 20 carbon atoms (e.g., a methyl group, an ethyl group, a butyl group, a 2-ethylhexyl group, and a dodecyl group), an aralkyl group having from 7 to 20 carbon atoms (e.g., a benzyl group and a phenetyl group), an aryl group having from 6 to 20 carbon atoms (e.g., a phenyl group and a naphthyl group), or an alkenyl group having from 2 to 20 carbon atoms (e.g., a vinyl group and a propenyl group).

It is also preferred for $R^{12}$ and $R^{13}$ to combine together to form a ring containing a nitrogen atom. It is preferably a 5- to 8-membered ring containing a nitrogen atom, or a nitrogen atom and at least one atom selecting from the group consisting of an oxygen atom, a sulfur atom, and a nitrogen atom. Examples of such rings are a pyrrolidine ring, a piperadine ring, and a morpholine ring. These rings may be substituted. It is particularly preferred that $R^{12}$ and $R^{13}$ combine together to form a pyrrolidine ring.

In the case that $R^{14}$ and $R^{15}$ combine together to form a ring, it is preferred for them to form a 5- to 8-membered cycloalkyl group, such as a cyclohexane ring and a cyclopentane ring. These rings may be substituted.

$R^2$ and $R^3$ each preferably represents a straight or branched alkyl group having from 1 to 20 carbon atoms (e.g., a methyl group, an ethyl group, a butyl group, a 2-ethylhexyl group, and a dodecyl group), an aralkyl group having from 7 to 20 carbon atoms (e.g., a benzyl group and a phenetyl group), an aryl group having from 6 to 20 carbon atoms (e.g., a phenyl group and a naphthyl group), or an alkenyl group having 2 to 20 carbon atoms (e.g., a vinyl group and a propenyl group). $R^2$ and $R^3$ may be substituted. Examples of such substituents include a halogen atom (e.g., F, Cl, Br and I), an alkoxy group having from 1 to 20 carbon atoms, an aryloxy group having from 6 to 20 carbon atoms, an N,N-di-substituted carbamoyl group, and an N,N-di-substituted sulfamoyl group. Examples for the substituent on the nitrogen atom include an alkyl group having from 1 to 20 carbon atoms, an aryl group having from 6 to 20 carbon atoms and an aralkyl group having from 7 to 20 carbon atoms.

A sulfo group is also preferred as a substituent of $R^2$ or $R^3$. In this case, $X^\ominus$ and $R^3$ combine together to form an intramolecular salt. It is also preferred for $R^2$ and $R^3$ to combine together to form a ring containing a nitrogen atom. It is preferably a 5- to 8-membered ring containing a nitrogen atom, or a nitrogen atom and at least one atom selected from the group consisting of an oxygen atom, a sulfur atom, and a nitrogen atom. Examples of such rings are a pyrrolidine ring, a piperadine ring, and a morpholine ring. These rings may be substituted. It is particularly preferred for them to form a pyrrolidine ring.

It is also preferred for $R^1$ and $R^2$ to combine together to form a ring containing a nitrogen atom. It is preferably a 5- to 8-membered ring containing a nitrogen atom, or a nitrogen atom and at least one atom selected from the group consisting of an oxygen atom, a sulfur atom and a nitrogen atom. The ring may further be condensed with a benzene ring to form a condensed benzene ring. Particularly preferred examples of such rings are pyridine ring, a quinoline ring, an isoquinoline ring, an oxazole ring, a benzoxazole ring, an oxazoline ring, an imidazole ring, a benzimidazole ring, an imidazoline ring, a thiazole ring, a benzothiazole ring, and a thiazoline ring. These rings may be substituted.

$R^4$ and $R^5$ each preferably represents a straight or branched alkyl group having from 1 to 20 carbon atoms (e.g., a methyl group, an ethyl group, a butyl group, a 2-ethylhexyl group, and a dodecyl group), an aralkyl group having from 7 to 20 carbon atoms (e.g., a benzyl group and a phenetyl group), an aryl group having from 6 to 20 carbon atoms (e.g., a phenyl group and a naphthyl group), an alkenyl group having from 2 to 20 carbon atoms (e.g., a vinyl group and a propenyl group), a group

a group $R^{42}\text{-SO}_2-$, or a group $R^{43}\text{-N}=\text{N}-$, $R^4$ and $R^5$ may be substituted. Examples of such substituents include a halogen atom (e.g., F, Cl, Br, and I), an alkoxy group having from 1 to 20 carbon atoms, an aryloxy group having from 6 to 20 carbon atoms, an N,N-di-substituted carbamoyl group, and an N,N-di-substituted sulfamoyl group. Examples for the substituent on the nitrogen atom include an alkyl group having from 1 to 20 carbon atoms, an aryl group having from 6 to 20 carbon atoms and an aralkyl group having from 7 to 20 carbon atoms. $R^4$ and $R^5$ may be the same or different.

$R^{41}$, $R^{42}$, and $R^{43}$ each preferably represents a straight or branched alkyl group having from 1 to 20 carbon atoms (e.g., a methyl group, an ethyl group, a butyl group, a 2-ethylhexyl group, and a dodecyl group), an aralkyl group having from 7 to 20 carbon atoms (e.g., a benzyl group and a phenetyl group), an aryl group having from 6 to 20 carbon atoms (e.g., a phenyl group and a naphthyl group), or an alkenyl group having from 2 to 20 carbon atoms (e.g., a vinyl group and a propenyl group).

$R^4$ and $R^5$ can share the same carbon atom such that the group

takes a form of

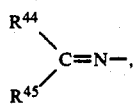

wherein $R^{44}$ and $R^{45}$ each represents a hydrogen atom or a group as defined for $R^{41}$, $R^{42}$, and $R^{U\,43}$.

It is also preferred for $R^4$ and $R^5$ to combine together to form a nitrogen-containing heterocyclic ring. Examples of such rings include a phthalimide ring, a succinimide ring, a glutarimide ring, a piperadine ring, and a benzotriazole ring. These rings may be substituted. It is particularly preferred that $R^4$ and $R^5$ combine together to form a succinimide ring or a benzotriazole ring.

$X^\ominus$ represents an anion. Examples include a halide ion (e.g., $Cl^\ominus$ or $Br^\ominus$), a sulfonate ion, a sulfate ion, a phosphonate ion, a phosphate ion, $BF_4^\ominus$, $ClO_4^\ominus$, and $PF_6^\ominus$. Particularly preferred are $Cl^\ominus$, $BF_4^\ominus$, $PF_6^\ominus$ and a sulfonate ion. The sulfonate ion is preferably an alkylsulfonate ion having from 1 to 20 carbon atoms, an aralkylsulfonate ion having from 7 to 20 carbon atoms, or an arylsulfonate ion having from 6 to 20 carbon atoms.

Typical examples of the compound that is used in the present invention are shown below, although the present invention is not limited thereto.
Compound 1
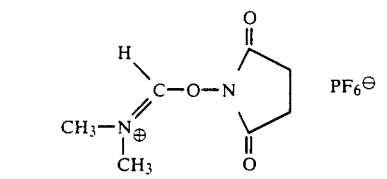
Compound 2
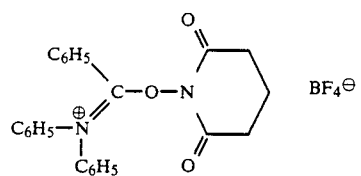
Compound 3
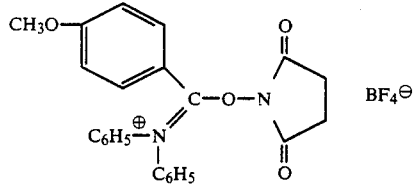
Compound 4
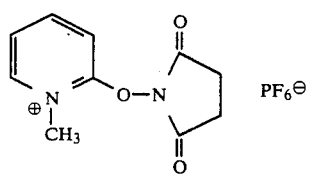
Compound 5
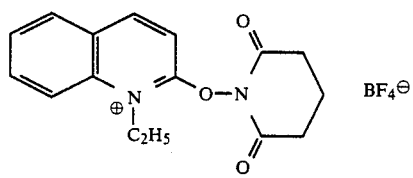
Compound 6
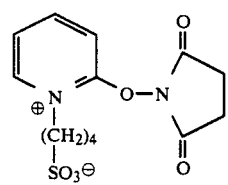
Compound 7
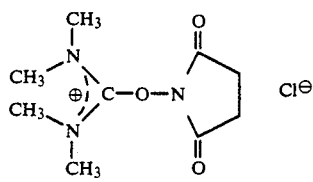
Compound 8
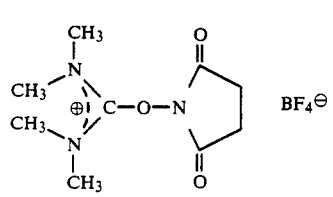
-continued
Compound 9
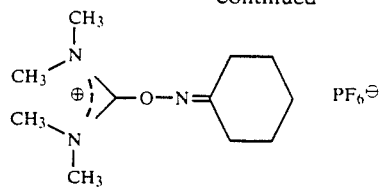
Compound 10
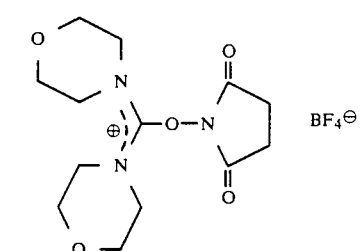
Compound 11
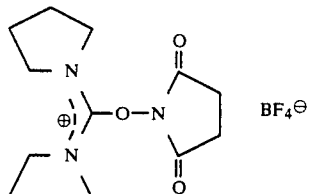
Compound 12
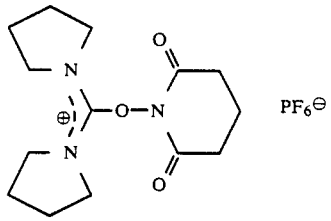
Compound 13
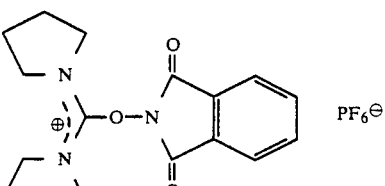
Compound 14
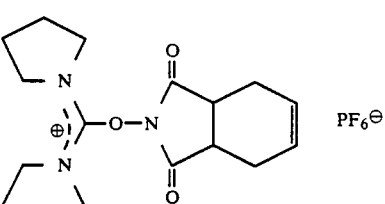
Compound 15
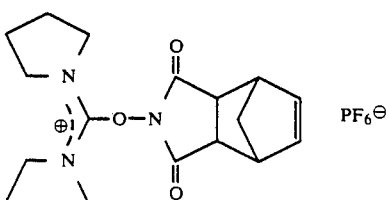

9
-continued

Compound 16

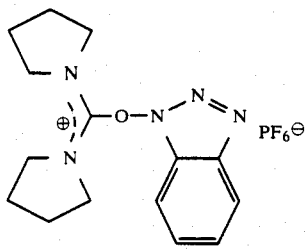

Compound 17

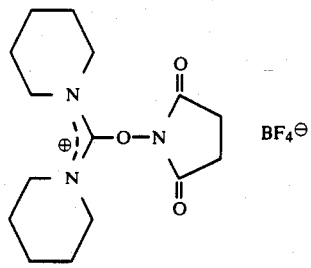

Compound 18

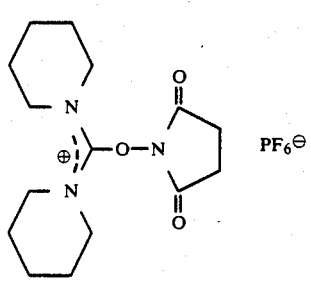

Compound 19

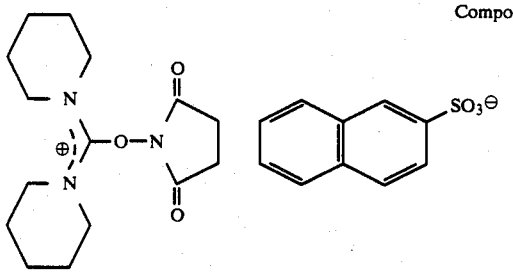

Compound 20

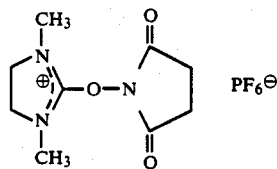

Compound 21

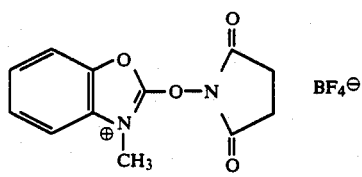

Compound 22

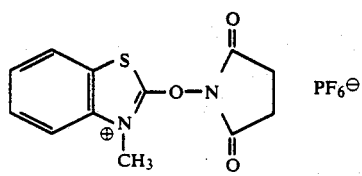

10
-continued

Compound 23

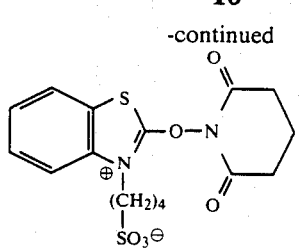

Preparation examples of several compounds of the present invention are shown below.

PREPARATION EXAMPLE 1

Preparation of Compound 4

56.8 g of 2-chloropyridine and 93.1 g of methyl p-toluenesulfonate were mixed and allowed to stand at room temperature for 2 days. Solidified contents were pulverized and then washed with ether and dried to yield white crystals. 30.0 g of the white crystals and 11.5 g of N-hydroxysuccinimide were dissolved in 80 ml of acetonitrile and then to the solution thus obtained was added dropwise 14 ml of triethylamine over 30 minutes while cooling with ice. The resulting mixture was stirred for 1 hour and the volatile portion was distilled off under reduced pressure. 160 ml of an aqueous solution containing 40 g of NH₄PF₆ was added to the resulting material. Crystals precipitated were collected by filtration, dried, and then recrystallized from a mixed solvent of 300 ml of acetonitrile and 300 ml of 1,2-dichloroethane, to yield the Compound 4 (yield: 15.2 g).

The chemical structure of the compound was confirmed by NMR spectrum, IR spectrum, and elemental analysis.

PREPARATION EXAMPLE 2

Preparation of Compound 8

10 ml of oxalyl chloride was added to a solution 11.6 g of N,N,N',N'-tetramethylurea in 50 ml of 1,2-dichloroethane, and then stirred at 40° C. for 2 hours. The volatile portion was distilled off under reduced pressure, and then dissolved in 100 ml of methylene chloride and cooled to −20° C. To the thus obtained resulting material, 11.5 g of N-hydroxysuccinimide was added, and 14 ml of triethylamine was further added over 15 minutes. The resulting mixture was stirred for 4 hours at that temperature, and then a triethylamine hydrochloric acid salt was removed by filtration. The residue was condensed under reduced pressure. A solution of 21 g of NH₄BF₄ in 100 ml of water was added to the condensate. Crystals precipitated were collected by filtration, dried and then recrystallized from a mixed solvent of 70 ml of acetonitrile and 80 ml of acetone to yield the Compound 8 (yield: 9.5 g).

The chemical structure of the compound was confirmed by NMR spectrum, IR spectrum, and elemental analysis.

PREPARATION EXAMPLE 3

Preparation of Compound 10

10 ml of oxalyl chloride was added to a solution of 20.1 g of N,N'-carbonyldimorpholine in 80 ml of 1,2-dichloroethane, and the resulting mixture was stirred at 60° C. for 3.5 hours. After distillation of the volatile material under reduced pressure, the residue was dissolved in 100 ml of methylene chloride and further cooled to −20° C. To the resulting material, 11.5 g of N-hydroxysuccinimide was added, and 14 ml of triethylamine was added dropwise over 15 minutes. The resulting mixture was stirred for 4 hours at −10° C. and then concentrated under reduced pressure. A solution of 21 g of $NH_4BF^{\ominus}$ in 100 ml of water was added to the above-obtained residue. Crystals precipitated were collected by filtration and further dried. These crystals were dissolved in 30 ml of acetonitrile by heating and then 60 ml of acetone was added. The resulting mixture was cooled. Crystals precipitated were collected by filtration and dried to yield the Compound 10 (yield: 12.3 g).

The chemical structure of the compound was confirmed by NMR spectrum, IR spectrum and elemental analysis.

PREPARATION EXAMPLE 4

Preparation of Compound 16

2 ml of oxalyl chloride was added to a solution of 3.4 g of N,N'-carbonylpyrrolidine in 20 ml of 1,2-dichloroethane, and the resulting mixture was stirred at 40° C. for 2 hours. After distillation of the volatile material under reduced pressure, the residue was dissolved in 30 ml of acetone. The resulting solution was cooled to −10° C. and then 2.7 g of 1-hydroxybenzotriazole was added thereto. At this temperature, 2.9 ml of triethylamine was added dropwise to the mixture over 30 minutes. The resulting mixture was allowed to return to room temperature and stirred over 30 minutes. Crystals precipitated were collected by filtration and added to a solution of 9.9 g of $NH_4PF_4$ in 40 ml of water to precipitate crystals. After filtration and drying, the crystals were recrystallized from a mixed solvent of acetonitrile and acetone (2/1 by volume) to yield the Compound 16 (yield: 5.0 g).

The chemical structure of the compound was confirmed by NMR spectrum, IR spectrum, and elemental analysis.

Other compounds can be prepared by the above methods or analogous methods, varying the reacting materials in view of the final product desired.

If the compound of formula (I) is applied as a hardening agent to a gelatin-containing photographic layer, undesirable phenomena such as deterioration of photographic properties, e.g., fog and desensitization, formation of stain, and reactions with a coupler contained in the color photographic light-sensitive material are not observed. Moreover, hardening can be achieved very rapidly, and the degree of hardening that could be finally reacted can be reached within several days after coating. Thereafter, the phenomenon that a degree of hardening increases, i.e., post-hardening is not substantially observed. Moreover, a side reaction wherein the hardening agent releases an acid at the time of the hardening reaction, thereby lowering the pH of the system, as in the case of use of a condensed hardening agent of the halogen atom-releasing type, does not occur at all.

The compound of formula (I) is excellent in its solubility for water and does not need a special organic solvent for incorporating it in a gelatin-containing layer. Thus, the compound of formula (I) is free from problems due to the use of such organic solvents, such as uneven coating. It is, furthermore, not necessary to take care for the prevention of the occurrence of explosions caused by the use of an organic solvent. Moreover, the compound of formula (I) does not have a special physiological action and its vapor pressure is low. Thus the compound of the present invention does not exert adverse influence on human body.

The hardening agent of the present invention can be used in conventional manner.

The amount of the hardening agent of formula (I) to be used can be chosen appropriately depending on the purpose for which the gelatin is used. Usually the compound is used in an amount of from 0.01 to 20 wt%, based on the weight of dry gelatin. More preferably, it is used in an amount of from 0.05 to 10 wt% based on the weight of dry gelatin.

The compound of formula (I) can also be effectively used as a hardening agent for partial hardening, which is used in a method of increasing the chain length of gelatin by partial hardening, as described in Japanese Patent Application (OPI) No. 2324/81 (corresponding to U.S. Pat. No. 4,421,847). Moreover the compound can be used to harden such gelatin that has already been increased in chain length.

The compound of formula (I) that is used as a hardening agent in the present invention can be used in all photographic light-sensitive materials using gelatin. These materials include color light-sensitive materials such as color negative film, color reversal film, color positive film, color printing paper, color reversal printing paper, and a light-sensitive material of the color diffusion transfer system or silver dye-bleaching system, and black-and-white light-sensitive materials such as black-and-white film, X-ray film, film for production of printing plate, black-and-white printing paper, aerial film, microfilm, facsimile film, phototypographic film or printing paper, and graphic arts film.

There are no special limitations on the photographic layer(s) in which the hardening agent of the present invention is used. The hardening agent can be used, as well as in a silver halide emulsion layer, in any other gelatin-containing photographic layer(s), such as a subbing layer, a back layer, a filter layer, an intermediate layer, and an overcoat layer.

The hardening agents of the present invention can be used alone or in combination with each other. Moreover they may be used in combination with other known hardening agents.

Typical examples of such known hardening agents are aldehyde-based compounds such as formaldehyde and glutaraldehyde, ketone compounds such as diacetyl and cyclopentanedione, compounds containing a reactive halogen atom such as bis(2-chloroethylurea), 2-hydroxy-4,6-dichloro-1,3,5-triazine and compounds as described in U.S. Pat. Nos. 3,288,775, 2,732,303, British Pat. Nos. 974,723, and 1,167,207, compounds containing a reactive olefin such as divinyl sulfone, 5-acetyl-1,3-diacryloylhexahydro-1,3,5-triazine, and compounds as described in U.S. Pat. Nos. 3,635,718, 3,232,763, British Pat. No. 994,869, Japanese Patent Application (OPI) Nos. 41221/78 and 57257/78, N-methylol compounds such as N-hydroxymethylphthalimide and compounds as described, for example, in U.S. Pat. Nos. 2,732,316 and 2,586,168, isocyanate compounds as described, for example, in U.S. Pat. No. 3,103,437, aziridine compounds as described, for example, in U.S. Pat. Nos. 3,017,280 and 2,983,611, acid derivatives as described, for example, in U.S. Pat. Nos. 2,725,294 and 2,725,295, carbodiimide-based compounds as described, for example, in U.S. Pat. No. 3,100,704, epoxy compounds as described, for example, in U.S. Pat. No. 3,091,537, isooxazole-based compounds as described, for example, in U.S. Pat. Nos. 3,321,313 and 3,543,293, halogenocarboxylaldehydes such as mucochloric acid, dioxane derivatives such as dihydroxydioxane and dichlorodioxane, dihydroquinone-based compounds as described above, compounds having a phosphorus-halogen bond, N-sulfonyloxyimide-based compounds, N-acyloxyimino-based compounds, N-carbonyloxyimide-based compounds as described in Japanese Patent Application (OPI) No. 43353/81, 2-sulfonyloxypyridinium salts, and N-carbamoylpyridinium salts. In addition, as inorganic hardening agents, chromium alum, and zirconium sulfate can be used. Moreover, the hardening agents of the present invention can be used in combination with precursors of the above compounds, such as alkali metal bisulfite-aldehyde adducts, methylol derivatives of hydantoin, primary aliphatic nitroalcohols, mesyloxyethylsulfonyl-based compounds, and chloroethylsulfonyl-based compounds. In the case that the hardening agent of the present invention is used in combination with other hardening agents, the amount of the hardening agent of the present invention being used is chosen appropriately depending on the purpose of use of the gelatine and the effect of the agent. Usually it is preferred that the amount of the hardening agent of the present invention being used be at least 50 mol%.

In combination with the hardening agent of the present invention, compounds accelerating hardening of gelatin can be used. Typical examples of such hardening-accelerating agents are nonprotonic solvents as described in West German OLS No. 2,417,586, betain-type surface active agents as described in Japanese Patent Application (OPI) No. 62045/82, tert-amines and their salts as described in, for example, Japanese Patent Application (OPI) Nos. 1043/81, 9434/76, West German OLS No. 2,138,305, British Pat. Nos. 1,284,305 and 1,269,983, various norganic salts, and polyhydric alcohols. Of course, in combination with the hardening agent of the present invention and the above known hardening agents, these hardening-accelerating agents can be used. For example, in combination with the hardening agent of the present invention and a vinylsulfon-based hardening agent, polymers containing a sulfinic acid group as described in Japanese Patent Application (OPI) No. 4141/81 can be used as hardening-accelerating agents.

The hardening agent of the present invention is applicable to any type of gelatin, such as so-called alkali-treated (lime-treated) gelatin which is dipped in an alkali bath prior to gelatin extraction in the course of preparation thereof, acid-treated gelatin which is dipped in an acid bath, double dipped gelatin which is dipped in both the alkali and acid baths, and enzyme-treated gelatin as described, for example, in *Bull. Soc. Photo. Japan*, No. 16, page 30 (1966).

In a case that the hardening agent of the present invention is applied to a photographic light-sensitive material, dispersions of water-insoluble or sparingly water soluble synthetic polymers can be incorporated in a photographic light-sensitive emulsion and other hydrophilic colloid layers for the purpose, e.g., of improving their dimensional stability. For example, homo- and copolymers of alkyl acrylate or methacrylate, alkoxyalkyl acrylate or methacrylate, glycidyl acrylate or methacrylate, acrylamide or methacrylamide, vinyl esters (e.g., vinyl acetate), acrylonitrile, olefins, and styrene, and copolymers of the above monomers and comonomers such as acrylic acid, methacrylic acid, $\alpha,\beta$-unsaturated dicarboxylic acid, hydroxyalkyl acrylate or methacrylate, sulfoalkyl acrylate or methacrylate, and styrenesulfonic acid can be used.

In a case that the hardening agent of the present invention is used in a photographic light-sensitive material, a matting agent can be used in combination. As matting agents, finely divided water-insoluble organic or inorganic compounds can be used. The average particle diameter of the matting agent is preferably from 0.2 to 10 $\mu$m and more preferably from 0.3 to 5 $\mu$m.

In the case that the hardening agent of the present invention is used in a photographic light-sensitive material, dye-forming couplers, e.g., a yellow coupler (i.e., a yellow-dye-forming coupler), a magenta coupler, and a cyan coupler, may be used, alone or in combination with each other.

Typical examples of the magenta coupler are described, for example, in U.S. Pat. Nos. 2,600,788, 2,369,489, 2,343,703, 2,311,082, 3,152,896, 3,519,429, 3,062,653, 2,908,573, 3,725,067, and British Pat. No. 1,047,612. Of these magenta couplers, 5-pyrazolone or pyrazoloazoles (e.g., pyrazolopyrazole, pyrazoloimidazole, pyrazolotriazole, and pyrazolotetrazole) are preferred.

Typical examples of the cyan coupler are described, for example, in U.S. Pat. Nos. 2,772,162, 2,895,826, 3,002,836, 3,034,892, 2,474,293, 2,423,730, 2,367,531 and 3,041,236. Of these cyan couplers, phenols and naphthols are preferred. As compounds used to increase the fastness of formed dye, cyan couplers as described, for example, in Japanese Patent Publication No. 37857/82, Japanese Patent Application (OPI) Nos. 80045/81, 31953/84, and 31954/84 can be given.

In some cases, so-called polymer couplers comprising one or more compounds having an ethylenically polymerizable group in a position other than the coupling position of the above yellow, magenta or cyan coupler, or further, if desired, containing a repeating unit of noncolor forming monomers, can be used.

These couplers can be incorporated in a silver halide emulsion layer by known techniques, such as the method described in U.S. Pat. No. 2,322,027. For example, the coupler is dissolved in phthalic acid alkyl esters (e.g., dibutyl phthalate and dioctyl phthalate), phosphoric acid esters (e.g., diphenyl phosphate, triphenyl phosphate, tricresyl phosphate, and dioctylbutyl phosphate), citric acid esters (e.g., tributyl acetylcitrate), benzoic acid esters (e.g., octyl benzoate), alkylamides (e.g., diethyllaurylamide), fatty acid esters (e.g., dibutoxyethyl succinate and diethyl azelate), trimesic acid esters (e.g., tributyl trimesicate), or organic solvents having a boiling point of about 30° to 150° C., such as lower alkyl acetates (e.g., ethyl acetate and butyl acetate), ethyl propionate, sec-butyl alcohol, methylisobutyl ketone, $\beta$-ethoxyethyl acetate, and methylcellosolve acetate, and then dispersed in a hydrophilic colloid. The high-boiling and low-boiling organic solvents can be used in combination with each other.

A dispersion method using polymers as described in Japanese Patent Publication No. 39853/76 and Japanese Patent Application (OPI) No. 59943/76 can be used.

In the case that the coupler contains an acid group such as carboxylic acid and sulfonic acid, it is introduced in the hydrophilic colloid as an alkaline aqueous solution thereof.

In the case that a polymeric coupler is used, an emulsion polymerization product may be added to the emulsion as such, or alternatively, after a solution polymerization, a polymer which has been separated from the reaction solution may be again dissolved in an organic solvent and then dispersed in the emulsion.

In a case that the hardening agent of the present invention is used in a photographic light-sensitive material, as silver halide, any of silver bromide, silver iodobromide, silver iodochlorobromide, silver chlorobromide, and silver chloride can be used.

The average particle size of silver halide particles contained in the photographic emulsion (which is a particle diameter when the silver halide particles are spherical or nearly spherical, and, when the particles are cubic, the edge length is regarded as a particle size, the average size is determined from projected areas) is not critical. Preferably the average particle size is not more than 3 μm.

The particle size distribution may be broad or narrow.

Silver halide particles contained in the photographic emulsion may have a regular crystal form, such as cubic and octahedral, or an irregular crystal form, such as spherical and plate-like, or a composite crystal form of the above crystal forms. Moreover the silver halide particles may be composed of particles having various crystal forms.

In addition, an emulsion may be used in which ultratabular silver halide particles such that the diameter is more than five times the thickness constitute at least 50% of the total projected area.

Silver halide particles may be such that the inside portion and the surface layer have different phases. Moreover, the particles may be such that a latent image is formed mainly on the surface or mainly in the inside of particles.

A so-called reversal mixing method in which particles are formed in the presence of an excess of silver ions can be employed. As one embodiment of the double jet method, a method in which pAg of a liquid phase wherein silver halide is formed is maintained at a constant value, i.e., so-called controlled double jet method can be employed.

In accordance with this method, a silver halide emulsion in which the crystal form is regular and the particle size is nearly uniform can be obtained.

Two or more silver halide emulsions which are prepared separately can be used in combination with each other.

In the course of formation or physical ripening of silver halide particles, cadmium salts, zinc salts, lead salts, thallium salts, iridium salts or its complex salts, rhodium salts or its complex salts, iron salts or its complex salts, and the like may be allowed to coexist.

The silver halide emulsion is usually chemically sensitized. For instance, the sulfur sensitization method using compounds containing sulfur, capable of reacting with active gelatin or silver (e.g., thiosulfuric acid salts, thioureas, mercapto compounds, and rhodanines), the reduction sensitizing method using reducing substances (e.g., stannous salts, amines, hydrazine derivatives, formamidinesulfinic acid, and silane compounds), the noble metal sensitization method using noble metal compounds (e.g., gold complex salts, and complex salts of Group VIII metals such as Pt, Ir, and Pd), and so forth can be used, alone or in combination with each other.

In the photographic emulsion of the photographic light-sensitive material in which the hardening agent of the present invention is used, various compounds can be incorporated for the purpose of preventing fog or stabilizing photographic performance during the preparation, storage, or photographic processing of the light-sensitive material.

In the photographic emulsion layer or other hydrophilic colloid layers, various surface active agents may be incorporated for various purposes, e.g., of improving coating properties, improving sliding properties, accelerating emulsification and dispersion, preventing adhesion, or improving photographic characteristics (e.g., acceleration of development, increasing contrast, and sensitization).

In the photographic emulsion layer of the photographic light-sensitive material, polyalkylene oxide or its derivatives, such as ethers, esters and amines, thioether compounds, thiomorpholines, quaternary ammonium salt compounds, urethane derivatives, urea derivatives, imidazole derivatives, 3-pyrazolidones, and the like may be incorporated for the purpose of increasing sensitivity or contrast, or accelerating development.

The photographic emulsion may be subjected to spectral sensitization using methine dyes and the like.

The hardening agent of the present invention is applicable to a multi-layer polychromatic photographic material bearing at least two layers having different spectral sensitivities on a support. A multi-layer natural color photographic material bears at least one red-sensitive emulsion layer, at least one green-sensitive emulsion layer, and at least one blue-sensitive emulsion layer on the support. The order in which the red-sensitive emulsion layer, the green-sensitive emulsion layer, and the blue-sensitive emulsion layer are provided on the support can be determined optionally. Usually the red-sensitive emulsion layer contains a cyan-forming coupler, the green-sensitive emulsion layer contains a magenta-forming coupler, and the blue-sensitive emulsion layer contains a yellow-forming coupler. In some cases, different combinations can be employed.

In a light-sensitive material prepared in accordance with the present invention, if a hydrophilic colloid layer contains a dye, an ultraviolet absorber, or the like, such may be mordanted with cationic polymers, for example.

The light-sensitive material prepared in accordance with the present invention may contain, as anti-color foggants, hydroquinone derivatives, aminophenol derivatives, galic acid derivatives, ascorbic acid derivatives, and the like.

The light-sensitive material prepared in accordance with the present invention may contain ultraviolet absorbers in its hydrophilic colloid layer. Ultraviolet absorbers which can be used in the present invention include benzotriazoles substituted with an aryl group (as described, for example, in U.S. Pat. No. 3,533,794), 4-thiazolidone compounds (as described in U.S. Pat. Nos. 3,314,794 and 3,352,681), benzophenone compounds (as described, for example, in Japanese Patent Application (OPI) No. 2784/71), cinnamic acid ester compounds (as described, for example, in U.S. Pat. Nos. 3,705,805 and 3,707,375), butadiene compounds (as described, for example, in U.S. Pat. No. 4,045,229), and benzooxidole compounds (as described, for example, in U.S. Pat. No. 3,700,455). In addition, ultraviolet ray-absorbing couplers (e.g., α-naphthol-based cyan dye-forming couplers), ultraviolet ray-absorbing polymers, and the like. These ultraviolet ray-absorbing agents may be mordanted to a specified layer.

The light-sensitive material prepared in accordance with the present invention may contain in its hydrophilic colloid layer water-soluble dyes as filter dyes or for various purposes such as prevention of irradiation. Dyes which can be used for such proposes include oxonol dyes, hemioxonol dyes, styryl dyes, merocyanine dyes, cyanine dyes, and azo dyes. Of these dyes, hemioxonol and merocyanine dyes are particularly useful.

In the practice of the present invention, known antifading agents as described hereinafter can be used in combination. Color image-stabilizing agents (antifogging agents) which are used in the present invention can be used alone or as mixtures comprising two or more thereof. Known antifading agents include hydroquinone derivatives (as described, for example, in Japanese Patent Application (OPI) No. 10539/84), gallic acid derivatives, p-alkoxyphenols, p-oxyphenol derivatives, and bisphenols.

In photographic processing of a layer comprising a photographic emulsion as prepared in accordance with the present invention, any of known methods and processing solutions as described, for example, in *Research Disclosure*, No. 176, December 1978, pp. 28–30 can be applied. The processing temperature is usually chosen within the range of from 18° to 50° C., but temperatures lower than 18° C. and temperatures higher than 50° C. can also be employed.

A fixing solution having a commonly used composition can be used. As fixing agents, in addition to thiosulfuric acid salts and thiocyanic acid salts, organosulfuric compounds known to be effective as fixing agents can be used. The fixing solution may contain a water-soluble aluminum salt as a hardening agent.

A color developer usually comprises an alkaline aqueous solution containing a color developing agent. As such color developing agents, known primary aromatic amine developing agents, such as phenylenediamines (e.g., 4-amino-N,N-diethylaniline, 3-methyl-4-amino-N,N-diethylaniline, 4-amino-N-ethyl-N-$\beta$-hydroxyethylaniline, 3-methyl-4-amino-N-ethyl-N-$\beta$-hydroxyethylaniline, 3-methyl-4-amino-N-ethyl-N-$\beta$-methanesulfoamidoethylaniline, and 4-amino-3-methyl-N-ethyl-N-$\beta$-methoxyethylaniline) can be used.

In addition, compounds as described in L. F. A. Mason, *Photographic Processing Chemistry*, Focal Press Co., pp. 226–229 (1966), U.S. Pat. Nos. 2,193,015, 2,592,364, and Japanese Patent Application (OPI) No. 64933/73 can be used.

The color developer can further contain pH buffers (e.g., sulfites, carbonates, borates, and phosphates of alkali metals), antifoggants or development restrainers (e.g., bromides, iodides, and organic antifoggants). If desired, the color developer may contain a hard water-softening agent, a preservative (e.g., hydroxylamine), an organic solvent (e.g., benzyl alcohol and diethylene glycol), a development-accelerating agent (e.g., polyethylene glycol, quaternary ammonium salts, and amines), a dye-forming coupler, a competitive coupler, a fogging agent (e.g., sodium boron hydride), an auxiliary developing agent (e.g., 1-phenyl-3-pyrazolidone), a tackifier, a polycarboxylic acid-based chelating agent, an antioxidant, and the like.

After color development, the photographic emulsion layer is usually bleached. This bleaching may be carried out simultaneously with fixing, or they may be carried out separately. Bleaching agents which can be used include polyvalent metal (e.g., iron (III), cobalt (III), chromium (VI), and copper (II)) compounds, peracids, quinones, and nitroso compounds.

For example, potassium ferricyanide, sodium iron (III) ethylenediaminetetraacetate, and ammonium iron (III) ethylenediaminetetraacetate are particularly useful. Ethylenediaminetetraacetic acid iron (III) complex salts are useful in both an independent bleaching solution and a monobath bleach-fixing solution.

The gelatin-hardening method of the present invention can be preferably used not only in a photographic light-sensitive material, but also in fields where gelatin is hardened. For example, the present invention can be applied to the hardening of microcapsules, as described in U.S. Pat. No. 4,016,098.

The present invention is described in greater detail with reference to the following example, although it is not limited thereto.

EXAMPLE 1

In this example, Compounds 4, 8 and 11 of the present invention, Comparative Compound (II) (Compound 15 of Japanese Patent Application (OPI) No. 59625/76), and Comparative Compound (III) (Compound disclosed in U.S. Pat. No. 3,642,486 (Example II)) were used.

Each compound was added to a 7% aqueous gelatin solution in a proportion shown in Table 1, uniformly coated on a cellulose triacetate support in a dry coating thickness of about 8 $\mu$m, and dried to prepare a gelatin coating. In this way, gelatin coatings (A) to (I), respectively, were prepared.

As a control, a gelatin coating (J) not containing any hardening agent was prepared.

Each sample was allowed to stand under conditions of temperature of 25° C. and humidity of 50%. At 2 hours, 1 day, 3 days, and 7 days after coating, part of each sample was separated and tested to determine the crosslinking coefficient, $\delta$ (number of crosslinked units per weight average molecular weight of gelatin before crosslinking) according to the following method.

Measurement of Crosslinking Coefficient

A gelatin coating was peeled apart from the support, and its weight $M_1$ was measured. The gelatin coating was extracted with hot water to determine its sol content, and the amount of gelatin ($M_2$) was determined by the microbiuret method. The sol fraction S was calculated by the following equation:

$$S = (M_2/M_1)$$

Then the crosslinking coefficient $\delta$ was calculated by the equation shown below, as described in A. Charlesby, *Atomic Radiation and Polymers*, Pergamon Press Co., pp. 134–158 (1960).

$$\delta = \frac{2}{S + \sqrt{S}}$$

The results are shown in Table 1.

TABLE 1

| Gelatin Coating | Hardening Agent Type | Amount (per 100 g of gelatin) (mmol) | δ 2 hours | 1 day | 3 days | 7 days |
| --- | --- | --- | --- | --- | --- | --- |
| (A) | Compound 4 of the present invention | 10 | 3.1 | 3.0 | 3.2 | 3.2 |
| (B) | Compound 4 of the present invention | 20 | 5.0 | 5.2 | 5.1 | 5.1 |
| (C) | Compound 8 of the present invention | 10 | 3.3 | 3.4 | 3.5 | 3.4 |
| (D) | Compound 8 of the present invention | 20 | 5.5 | 5.6 | 5.5 | 5.6 |
| (E) | Compound 11 of the present invention | 10 | 3.5 | 3.6 | 3.6 | 3.6 |
| (F) | Compound 11 of the present invention | 20 | 5.9 | 5.8 | 5.8 | 5.9 |
| (G) | Comparative Compound II | 10 | 2.8 | 2.7 | 2.7 | 2.8 |
| (H) | Comparative Compound II | 20 | 4.5 | 4.3 | 4.4 | 4.4 |
| (I) | Comparative Compound III | 5 | 1.2 | 3.4 | 5.6 | 6.4 |
| (J) | (Control) | 0 | 1.0 | 1.0 | 1.0 | 1.0 |

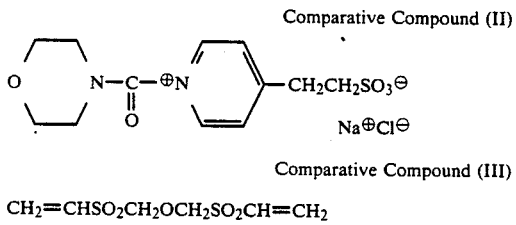

Comparative Compound (II)

Comparative Compound (III)

$CH_2=CHSO_2CH_2OCH_2SO_2CH=CH_2$

It can be seen from the results of Table 1 that in the gelatin coatings (A) to (F) using the compounds 4, 8, and 11 according to the present invention, the hardening speed is high; the hardening reaction is completed in about 2 hours after coating, and thereafter δ essentially does not change.

The comparative compound (II) is equivalent with the compounds 4, 8 and 11 of the present invention in respect of the hardening speed. However, by comparison of the gelatin coatings (A), (C), and (E) with the gelatin coating (G), or the gelatin coatings (B), (D) and (F) with the gelatin coating (H) (in which the comparative compound (II) is used in the same amount as the compound 4, 8 or 11), it can be seen that the comparative compound (II) is small in δ and thus its efficiency as a hardening agent is small. This is probably due to poor selectively for reaction with reactive residues contained in gelatin.

It can be seen that the comprative compound (III) is slow in the hardening speed and even after 3 days, δ is increasing (i.e., post-hardening occurs).

From the above results, it can be seen that the compounds 4, 8, and 11 of the present invention have a high hardening speed, and are hardening agents having high efficiency.

EXAMPLE 2

To a high sensitivity negative photographic emulsion prepared by the conventional method and containing 120 g of gelatin and 65 g of silver iodobromide per 1,000 g of the emulsion, the compound 11 of the present invention and the comparative compound (III) were added as indicated in Table 2. The resulting mixture was uniformyl coated on a cellulose triacetate support with a subbing layer in a dry coating thickness of 10 μm and then dried to prepare a sample. Each sample was allowed to stand at room temperature for 7 days and then measured for the degree of swelling, Q, represented by the equation shown below in water maintained at 25° C.

$$Q = \frac{\text{Increased Coating Thickness due to Swelling}}{\text{Coating Thickness in Dry Condition}}$$

The sample was soaked in water and a needle with a copper ball (radius: 0.4 mm) attached to the tip thereof was pressed to the surface of the sample. The load exerted on the copper ball was continuously changed within the range of 0 to 200 g while moving the needle in parallel with the coating of sample at a speed of 2.5 mm per second. In this way, a load at which a scratch was formed in the coating was determined.

The film samples were each exposed through a wedge, developed with a developer D-76 (developer for a black-and-white photographic material, prescribed by Eastman Kodack Co., Ltd.) at 20° C. for 8 minutes, fixed, washed with water, dried and then subjected to sensitometry to determined its sensitivity and fog. The results are shown in Table 2.

It can be seen from the results that the compounds according to the present invention produce a coating having a sufficiently high strength without significantly reducing photographic characteristics.

TABLE 2

| | Compound | | Photographic properties | | | | Coating Strength | |
|---|---|---|---|---|---|---|---|---|
| | | | 7 days after Coating (20° C.) | | Under Accelerated Conditions (50° C., 2 days) | | | Scratch |
| Run No. | Type | Amount (mmol per 100 g of gelatin) | Relative Sensitivity | Fog | Relative Sensitivity | Fog | Ω (7 days after coating) | Resistance (g) (7 days after coating) |
| 1 | Control | 0 | 100 | 0.06 | 100 | 0.09 | 9.9 | 7 |
| 2 | Compound 11 of the invention | 25 | 94 | 0.05 | 94 | 0.06 | 4.2 | 73 |
| 3 | Comparative compound (III) | 5 | 93 | 0.05 | 93 | 0.06 | 4.9 | 74 |

EXAMPLE 3

A silver iodobromide emulsion containing 3.0 mol% of silver iodide was prepared and then post-ripening was applied in the presence of sodium thiosulfate and a gold salt so as to obtain a maximum sensitivity. In this way, a high sensitivity negative emulsion was obtained.

1-(2',4',6'-Trichlorophenyl)-3-[3''-(2''', 4'''-ditert-amylphenoxyacetamido)benzamido]-5-pyrazolone was dissolved in a mixture of dibutyl phthalate and tricresyl phosphate, and then emulsified and dispersed in a gelatin solution with sorbitan monolaurate, Turkey red oil, and sodium dodecylbenzenesulfonate as emulsifying agents to prepare an oil-in-water(o/w) type coupler emulsion. This emulsion was mixed with the above-prepared high sensitivity negative emulsion.

The compound 11 of the present invention was added to the above-prepared mixture in an amount of 7.1 g (25 mmol) per 100 g of dry gelatin. The resulting mixture was coated on a cellulose triacetate base provided with a subbing layer in a dry coating thickness of about 10 μm and dried to prepare a color film with a single magenta layer for a test.

This color film was exposed through a step wedge, developed with a developer containing 4-amino-3-methyl-N-ethyl-β-hydroxyethylaniline sesquisulfate monohydrate is developing agent, and then was subjected to sensitometry to determine its color characteristics.

It was found that the compound of the present invention does not reduce the color-forming performance of a coupler and does not produce any color stain.

While the invention has been described in detail and with reference to specific embodiments thereof, it will be apparent to one skilled in the art that various changes and modifications can be made therein without departing from the spirit and scope thereof.

What is claimed is:

1. A hardened gelatin that has been hardened with at least one compound represented by formula (I)

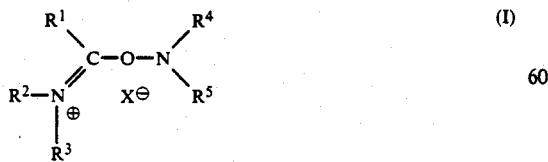

wherein $R^1$ represents a hydrogen atom, a substituted or unsubstituted alkyl group, a substituted or unsubstituted aralkyl group, a substituted or unsubstituted aryl group, a substituted or unsubstituted alkenyl group, a group $R^{11}O-$, a group

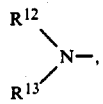

a group

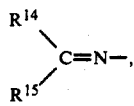

or a group $R^{16}S-$, wherein $R^{11}$, $R^{12}$, $R^{13}$, $R^{14}$, $R^{15}$, and $R^{16}$ each represents a substituted or unsubstituted alkyl group, a substituted or unsubstituted aralkyl group, a substituted or unsubstituted aryl group, or a substituted or unsubstituted alkenyl group; or $R^{14}$ and $R^{15}$ each represents hydrogen atoms, or $R^{12}$ and $R^{13}$ or $R^{14}$ and $R^{15}$ combine together to form a ring structure or $R^1$ together with $R^2$ forms a nitrogen-containing heterocyclic ring, or the thus formed ring is further condensed with another ring;

$R^2$ and $R^3$ each represents a substituted or unsubstituted alkyl group, a substituted or unsubstituted aralkyl group, a substituted or unsubstituted aryl group, or a substituted or unsubstituted alkenyl group, or combine together to form a nitrogen-containing heterocyclic ring;

$R^4$ and $R^5$ each represents a substituted or unsubstituted alkyl group, a substituted or unsubstituted aralkyl group, a substituted or unsubstituted aryl group, a substituted or unsubstituted alkenyl group, a group

a group $R^{42}-SO_2-$, or a group $R^{43}-N=N-$, or $R^4$ and $R^5$ share the same carbon atom such that the group

takes a form of

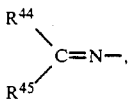

or $R^4$ and $R^5$ combine together to form a nitrogen-containing heterocyclic ring, or the thus formed ring is further condensed with another ring;

$R^{41}$, $R^{42}$, $R^{43}$, $R^{44}$, and $R^{45}$ each represents a substituted or unsubstituted alkyl group, a substituted or unsubstituted aralkyl group, a substituted or unsubstituted aryl group, or a substituted or unsubstituted alkenyl group; or $R^{44}$ and $R^{45}$ each represents a hydrogen atom or combine together to form a ring; and $X^{\ominus}$ represents an anion or combines together with another part of the compound of formula (I) to form an intramolecular salt.

2. A hardened gelatin as in claim 1, wherein $R^1$ represents a straight or branched substituted or unsubstituted alkyl group having from 1 to 20 carbon atoms, a substituted or unsubstituted aralkyl group having from 7 to 20 carbon atoms, a substituted or unsubstituted aryl group having from 6 to 20 carbon atoms, a substituted or unsubstituted alkenyl group having from 2 to 20 carbon atoms, a group $R^{11}O-$, a group

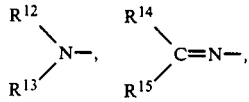

or a group $R^{16}-S-$, wherein $R^{11}$, $R^{12}$, $R^{13}$, $R^{14}$, $R^{15}$, and $R^{16}$ each represents a straight or branched substituted or unsubstituted alkyl group having from 1 to 20 carbon atoms, a substituted or unsubstituted aralkyl group having from 7 to 20 carbon atoms, a substituted or unsubstituted aryl group having from 6 to 20 carbon atoms, or a substituted or unsubstituted alkenyl group having from 2 to 20 carbon atoms, or $R^{12}$ and $R^{13}$ combine together to form a 5- to 8-membered ring, or $R^{14}$ and $R^{15}$ combine together to form a 5- to 8-membered ring, or $R^{14}$ and $R^{15}$ each represents hydrogen atoms.

3. A hardened gelatin as in claim 1, wherein $R^1$ and $R^2$ combine together to form a 5- to 8-membered ring containing a nitrogen atom or further containing at least one atom selected from the group consisting of an oxygen atom, a sulfur atom and a nitrogen atom.

4. A hardened gelatin as in claim 1, wherein $R^1$ and $R^2$ combine together to form a ring selected from the group consisting of a pyridine ring, a quinoline ring, an isoquinoline ring, an oxazole ring, a benzoxazole ring, an oxazoline ring, an imidazole ring, a benzimidazole ring, an imidazoline ring, a thiazole ring, a benzothiazole ring, and a thiazoline ring.

5. A hardened gelatin as in claim 1, wherein $R^{12}$ and $R^{13}$ combine together to form a 5- to 8-membered ring containing a nitrogen atom or further containing at least one atom selected from the group consisting of an oxygen atom, a sulfur atom and a nitrogen atom.

6. A hardened gelatin as in claim 2, wherein $R^{12}$ and $R^{13}$ combine together to form a ring selected from the group consisting of pyrolidine ring, a piperadine ring and a morpholine ring.

7. A hardened gelatin as in claim 2, wherein $R^{14}$ and $R^{15}$ combine together to form a 5- to 8-membered cycloalkyl group.

8. A hardened gelatin as in claim 1, wherein $R^2$ and $R^3$ each represents a straight or branched substituted or unsubstituted alkyl group having from 1 to 20 carbon atoms, a substituted or unsubstituted aralkyl group having from 7 to 20 carbon atoms, a substituted or unsubstituted aryl group having from 6 to 20 carbon atoms, or a substituted or unsubstituted alkenyl group having from 2 to 20 carbon atoms.

9. A hardened gelatin as in claim 1, wherein $R^2$ and $R^3$ are combined to form a 5- to 8-membered ring containing a nitrogen atom or further containing at least one atom selected from the group consisting of an oxygen atom, a sulfur atom and a nitrogen atom.

10. A hardened gelatin as in claim 1, wherein $R^2$ and $R^3$ combine together to form a ring selected from the group consisting of a pyrrolidine ring, piperadine ring and a morpholine ring.

11. A hardened gelatin as in claim 1, wherein $R^4$ and $R^5$ each represents a straight or branched substituted or unsubstituted alkyl group having from 1 to 20 carbon atoms, a substituted or unsubstituted aralkyl group having from 7 to 20 carbon atoms, a substituted or unsubstituted aryl group having from 6 to 20 carbon atoms, a substituted or unsubstituted alkenyl group having from 2 to 20 carbon atoms, a group

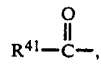

a group $R^{42}-SO_2$, or group $R^{43}-N=N-$, wherein $R^{41}$, $R^{42}$, and $R^{43}$ each represents a straight or branched substituted or unsubstituted alkyl group having from 1 to 20 carbon atoms, a substituted or unsubstituted aralkyl group having from 7 to 20 carbon atoms, a substituted or unsubstituted aryl group having from 6 to 20 carbon atoms, or a substituted or unsubstituted alkenyl group having from 2 to 20 carbon atoms.

12. A hardened gelatin as in claim 1, wherein $R^4$ and $R^5$ share the same carbon atom such that the group

forms the group

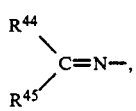

wherein $R^{44}$ and $R^{45}$ each represents a hydrogen atom, a straight or branched substituted or unsubstituted alkyl group having from 1 to 20 carbon atoms, a substituted or unsubstituted aralkyl group having from 7 to 20 carbon atoms, a substituted or unsubstituted aryl group having from 6 to 20 carbon atoms, a substituted or unsubstituted alkenyl group having from 2 to 20 carbon atoms or combine together to form a ring.

13. A hardened gelatin as in claim 1, wherein $R^4$ and $R^5$ combine to form a 5- to 8-membered ring containing a nitrogen atom or further containing at least one atom selected from the group consisting of an oxygen atom, a sulfur atom and a nitrogen atom.

14. A hardened gelatin as in claim 1, wherein $R^4$ and $R^5$ combine together to form a ring selected from the group consisting of a phthalimide ring, a succinimide ring, a glutarimide ring, a piperadine ring and a benzotriazole ring.

15. A hardened gelatin as in claim 1, wherein said substituents for each of $R^1$, $R^2$, $R^3$, $R^4$ and $R^5$ are selected from the group consisting of a halogen atom, an alkoxy group having from 1 to 20 carbon atoms, an aryloxy group having 6 to 20 carbon atoms, an N,N-di-substituted carbamoyl group and N,N-di-substituted sulfamoyl group.

16. A hardened gelatin as in claim 15, wherein the substituent for said N,N-di-substituted carbamoyl group and N,N-di-substituted sulfamoyl group is a substituent selected from the group consisting of an alkyl group having 1 to 20 carbon atoms, an aryl group havig from 6 to 20 carbon atoms and aralkyl group having from 7 to 20 carbon atoms.

17. A hardened gelatin as in claim 1, wherein $X^{\ominus}$ represents a halide ion $BF_4^{\ominus}$, $PF_6^{\ominus}$, $ClO_4^{\ominus}$ or sulfonate ion, a sulfate ion, a phosphonate ion or a phosphate ion.

18. A hardened gelatin as in claim 1, wherein $R^2$ or $R^3$ is substituted by a sulfo group and $X^{\ominus}$ and $R^3$ combine together to form an intramolecular salt.

19. A hardened gelatin as in claim 1, wherein said compound represented by formula (I) is used in an amount of form 0.05 to 10 wt% based on the weight of dry gelatin.

20. A hardened gelatin as in claim 1, wherein said hardened gelatin is contained in a photographic material.

21. A hardened gelatin as in claim 20, wherein said photographic material is a silver halide photographic material.

22. A hardened gelatin as in claim 21, wherein said hardened gelatin is contained in at least one of a silver halide emulsion layer, a subbing layer, a back layer, a filter layer, an intermediate layer and an overcoat layer.

23. A method for hardening gelatin which comprises incorporating in a gelatin at least one compound represented by formula (I):

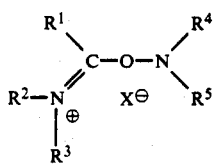  (I)

wherein:
$R^1$ represents a hydrogen atom, a substituted or unsubstituted alkyl group, a substituted or unsubstituted aralkyl group, a substituted or unsubstituted aryl group, a substituted or unsubstituted alkenyl group, a group $R^{11}$—O—, a group

a group

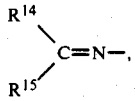

or a group $R^{16}S$—, wherein $R^{11}$, $R^{12}$, $R^{13}$, $R^{14}$, $R^{15}$ and $R^{16}$ each represents a substituted or unsubstituted alkyl group a substituted or unsubstituted aralkyl group, a substituted or unsubstituted aryl group, or a substituted or unsubstituted alkenyl group; or $R^{14}$ and $R^{15}$ each represents hydrogen atoms, or $R^{12}$ and $R^{13}$ or $R^{14}$ and $R^{15}$ combine together to form a ring structure or $R^1$ together with $R^2$ forms a nitrogen-containing heterocyclic ring or the thus formed ring is further condensed with another ring;

$R^2$ and $R^3$ each represents a substituted or unsubstituted alkyl group, a substituted or unsubstituted aralkyl group, a substituted or unsubstituted aryl group, or a substituted or unsubstituted alkenyl group, or combine together to form a nitrogen-containing heterocyclic ring;

$R^4$ and $R^5$ each represents a substituted or unsubstituted alkyl group, a substituted or unsubstituted aralkyl group, a substituted or unsubstituted aryl group, a substituted or unsubstituted alkenyl group, a group

a group $R^{42}$—SO$_2$—, or a group $R^{43}$—N=N—, or $R^4$ and $R^5$ share the same carbon atom such that the group

takes a form of

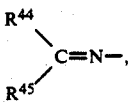

or $R^4$ and $R^5$ combine together to form a nitrogen-containing heterocyclic ring, or the thus formed ring is further condensed with another ring;

$R^{41}$, $R^{42}$, $R^{43}$, $R^{44}$, and $R^{45}$ each represents a substituted or unsubstituted alkyl group, a substituted or unsubstituted aralkyl group, a substituted or unsubstituted aryl group, or a substituted or unsubstituted alkenyl group; or $R^{44}$ and $R^{45}$ each represents a hydrogen atom or combine together to form a ring, and $X^{\ominus}$ represents an anion or combines together with another part of the compound of formula (I) to form an intramolecular salt.

* * * * *